United States Patent [19]

Parker et al.

[11] 4,130,459

[45] Dec. 19, 1978

[54] POISON AND DILUENT SYSTEM FOR NUCLEAR POWER PLANTS

[75] Inventors: Walter G. Parker, West Newton; Jack M. Ravets, Pleasant Hills; Bruce S. Preble, Pittsburgh, all of Pa.

[73] Assignee: Westinghouse Electric Corp., Pittsburgh, Pa.

[21] Appl. No.: 671,887

[22] Filed: Mar. 29, 1976

[51] Int. Cl.$^2$ .............................................. G21C 9/00
[52] U.S. Cl. ......................................... 176/38; 176/87
[58] Field of Search .................... 176/37, 38, 87, 91 R, 176/91 SP, 93 BP

[56] References Cited

U.S. PATENT DOCUMENTS

| | | | |
|---|---|---|---|
| 3,158,547 | 11/1964 | Smith | 176/69 |
| 3,275,523 | 9/1966 | Campbell, Jr. et al. | 176/44 |
| 3,361,638 | 1/1968 | Bokros et al. | 176/67 |
| 3,489,206 | 1/1970 | LeCourt | 165/47 |
| 3,565,762 | 2/1971 | Nickel | 176/86 |
| 3,711,371 | 1/1973 | Cahill, Jr. | 176/50 |
| 3,898,126 | 8/1975 | Dormer et al. | 176/87 |
| 3,917,768 | 11/1975 | Abate-Daga et al. | 176/68 X |

FOREIGN PATENT DOCUMENTS

| | | | |
|---|---|---|---|
| 2363845 | 6/1975 | Fed. Rep. of Germany | 176/38 |
| 2419033 | 9/1975 | Fed. Rep. of Germany | 176/38 |
| 2125927 | 4/1972 | France | 176/87 |
| 47-6476 | 2/1972 | Japan | 176/38 |

OTHER PUBLICATIONS

"Nuclear Safety of an Airborne Thermal Reactor" issued 10-71, Paper #LA-4783-MS.
Neue Huett, 12:350-5 (June 1967) in German.

Primary Examiner—Samuel W. Engle
Assistant Examiner—Ralph Palo
Attorney, Agent, or Firm—M. S. Yatsko

[57] ABSTRACT

A system to prevent supercriticality in nuclear power plants in the unlikely event of a core destructive accident terminating in the nuclear core meltdown. The system dilutes and poisons the molten core to maintain subcriticality, and is specially useful in mobile nuclear power plants, or in nuclear plants subject to seismic disturbances, where the orientation of the nuclear reactor after the accident is unknown. It is also applicable to alleviate the consequences of loss of coolant flow accidents from any cause. Aside from preventing supercriticality, the system serves the dual purpose of acting as a biological shield and/or structural member that reduces the deleterious effects of accidental core impaction, thus achieving its primary goal without compromising power plant weight and size constrants.

A borated material, with a melting point greater than the fuel melting point, is inserted in the pressure vessel behind an inner wall. In the unlikely event of a core meltdown, the molten fuel melts through the inner wall and is diluted and poisoned by the borated material. In the event the molten fuel melts through the pressure vessel, additional borated material is provided to continue diluting and poisoning.

11 Claims, 14 Drawing Figures

POISON AND DILUENT SYSTEM FOR NUCLEAR POWER PLANTS

BACKGROUND OF THE INVENTION

This invention relates generally to nuclear reactors and more particularly to a poison and dilution system for preventing supercriticality in nuclear power plants in the event of core disruptive accidents which result in core meltdown, and which is operational independently of the final reactor orientation.

Since the inception of the commercial nuclear power industry, prime concern of all parties involved has been safety. Regulatory bodies, commercial manufacturers, and others have spent vast sums of money in research, design, and development of redundant systems of assuring the safety of the public.

Regulatory bodies define the design requirement of at least a large portion of nuclear reactor plants in terms of accidents which have been experienced in the field and also in terms of hypothetical accidents which may be experienced in the nuclear industry. One such hypothetical accident is based on assumptions resulting in the melting of a portion of the reactor core and its related components into a flowing configuration. Under such hypothetical conditions, apparatus must be provided to prevent any combination of molten fuel into a large, supercritical assembly.

Prior art has generally prevented this combination into a supercritical assembly by containing the molten fuel in separate areas. These apparatus are generally located at the bottom of the reactor pressure vessel, and because of their structure and function, are commonly called core-catchers.

With the advent of the energy crisis, the use of nuclear energy to replace fossil fuels is being widely investigated. Among the various fields being investigated for possible conversion to nuclear energy is the transportation field. Prime contenders for conversion in this field include ships, airplanes and railroad trains.

As with conventional nuclear power plants, the design of these mobile power plants must take into account hypothetical accidents. Included within these postulated accidents is the possibility of a nuclear core meltdown. In addition to accidents occurring during normal full power operation, such as with the loss of reactor coolant, reactor core meltdown can also occur due to the decay heat of the fission products after reactor shutdown. Designing the power plant against accidents which leaves the core intact, therefore, is not sufficient. The possible recombination of molten fuel must also be prevented.

In addition to normal accidents arising during nuclear operation, mobile nuclear power plants must also be designed to guard against accidents which may occur because of the mobile nature of the power plants. One such type of accident, which is not a concern in the design of conventional nuclear power plants, is an impact accident; for example, the crash of an airborne nuclear power plant into the earth. A major problem with this type of accident is that the orientation of the nuclear power plant after the accident is unknown. Except in the event of violent seismic incidents, conventional nuclear power plants can utilize core catchers placed at the bottom of the reactor vessels because it is known in which direction the molten fuel will flow. This type of apparatus is not possible for mobile power plants, because until the actual accident occurs, it is not possible to determine which section of the power plant will be "down".

Another problem associated with preventing the supercriticality of the fuel in the event of a core meltdown in mobile power plants is weight. Because of their mobile nature, one of the most important design considerations is weight. Any system designed to prevent supercriticality of the molten fuel must not add so much weight that, taken in conjunction with the rest of the power plant, the power plant weighs too muct to be mobile.

SUMMARY OF THE INVENTION

The aforementioned problems in the prior art are eliminated by this invention by providing a means for preventing supercriticality of molten fuel in a mobile nuclear reactor independent of the final orientation of the nuclear reactor, and one that does not contribute greatly to the overall weight of the power plant. The invention utilizes a plurality of dense, high-melting, point pellets through which the molten fuel flows, and these pellets prevent the recombination of the molten fuel into a supercritical assembly. Additionally, the pellets are made of a high absorption cross-section material to absorb neutrons emitted by the molten fuel and thereby suppress criticality. The pellets are arranged in a 4-Pi configuration, such that the final orientation of the power plant is inconsequential.

Modifications of this invention include the use of low-density pellets positioned adjacent to the pressured vessel, held in place by a high melting point screen. The molten fuel is disbursed by the screen, and is kept disbursed and diluted by these pellets. As before, the pellets absorb the neutrons emitted by the molten fuel. Another modification of this invention utilizes cellular structures through which the molten fuel flows. The cellular structure disburses and separates the molten fuel to prevent supercriticality, and certain of these cells of the structure are lined with a high absorption cross-section material to capture neutrons emitted by the fuel. In addition to diluting, separating, and poisoning molten fuel, the elements of this invention also provide an isolation layer to mitigate the effects of an impact accident. The invention helps economize system weight by providing a dual purpose biological shield-structural member as the criticality suppression-device.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 2:
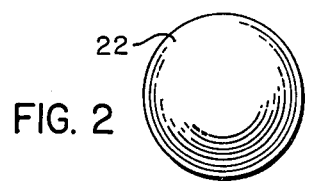
FIG. 2 is a cross-sectional view of a pellet utilized in FIG. 1.

Throughout the description which follows, like reference characters indicate like elements of the various figures of the drawings.

Figure 1:
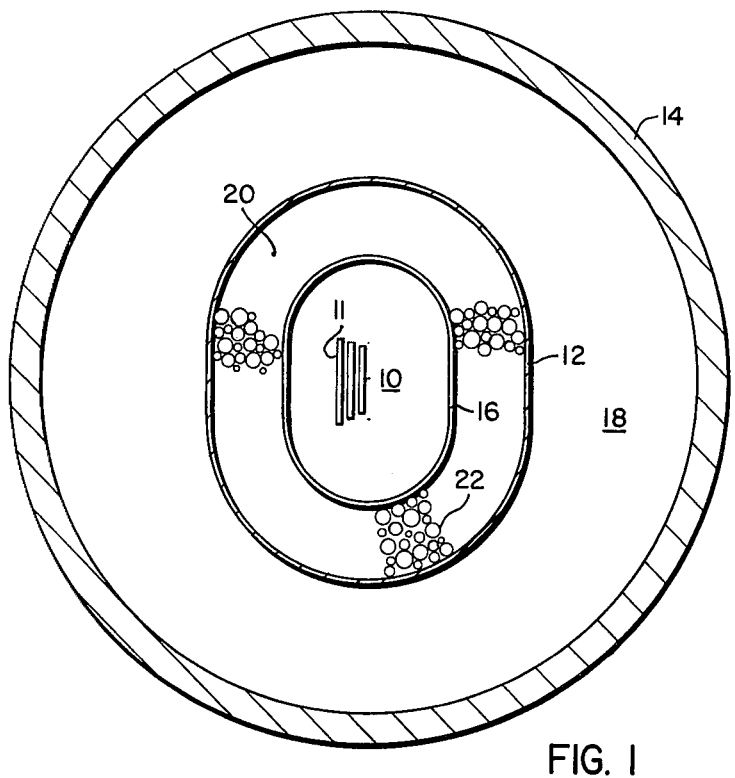
FIG. 1 is a schematic illustration of a mobile nuclear reactor utilizing this invention.

FIG. 1 is a schematic illustration in cross-section view of a nuclear reactor practicing the teachings of this invention. This nuclear reactor may be utilized for mobile operations; for example, in an aircraft, on a ship, or on a railroad train; may be utilized for nuclear power plants located in the oceans, or may be utilized in those areas where the installation of a conventional nuclear power plant is prohibited by the possibility of seismic disturbances such as earthquakes or tidal waves. Although it can also be used in conventional nuclear reactor installations, its optimum use is in those locations where the orientation of the reactor after an accident is unknown.

A nuclear core 10 is situated within a nuclear reactor pressure vessel 12. Although the core 10 can be of any configuration, for compactness the most efficient configuration generally has a core length to diameter ratio approximately one. The pressure vessel 12 entirely surrounds and encapsulates the nuclear core 10. Surrounding and encapsulating the pressure vessel 12 is a containment vessel 14. Located inside the pressure vessel 12 and encapsulating the nuclear core 10 is an inner wall 16. Encapsulating the pressure vessel 12, and located inside the containment vessel 14, is an outer shield 18. It is to be understood that FIG. 1 illustrates a cross-sectional view taken along any line through the nuclear reactor, and the entire nuclear reactor is a generally 4-Pi configuration.

An inner space 20 is formed between the inner wall 16 and the pressure vessel 12. Into this inner space 20 is inserted means for primary radiation shielding dilution of molten fuel and means for capturing neutrons emitted by the fuel, which in this instance are the pellets 22. These pellets 22 completely fill the inner space 20, and the pellets 22 are dense; that is, the density of these pellets 22 is greater than the density of the fuel 11 of the core 10. To enhance their radiation shielding effectiveness per unit volume, thus reducing the overall power plant size and weight, material 22 is composed of a uniform mixture of spheres of different sizes, increasing their packing fraction and, hence, density of this region. Additionally, these dense pellets 22 have a higher melting point than the melting point of the nuclear fuel 11. A third characteristic of these pellets 22 is they are made of a material with a high neutron absorption cross-section. As an example, the pellets 22 can be made of alloys of tungsten and boron or tungsten and gadolinium, although other materials having these aforementioned characteristics will suffice.

Figure 3:
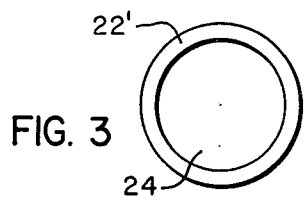
FIG. 3 is a cross-section view showing a modification of the pellet of FIG. 2.
Figure 4:
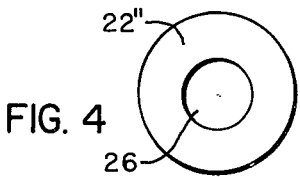
FIG. 4 is a cross-section view of a modification of the pellet shown in FIG. 2.

FIG. 2 illustrates one of these pellets 22 as being spherical. A modification of the pellets 22' is shown in FIG. 3. This pellet 22' is made of the same material, but has a hollow inside 24. FIG. 4 shows a further modification of the pellet 22. The pellet 22" is made of the same material, but has a hole 26 drilled through it, such that molten fuel 11 can flow through the pellet 22". Any of these configurations of the pellet 20, 22', 22" can be utilized in this invention, so long as the density of the pellet 22, 22', or 22" is greater than the density of the nuclear fuel 11.

The inner wall 16 is made of a material with a melting point less than the melting point of the nuclear fuel 11. An example of a material that may be utilized for the inner wall 16 and the pressure vessel 12 is stainless steel, with a melting point of approximately 1375° C. The containment vessel 14 may be of a material with a melting point greater than that of the fuel 11 if additional safety considerations warrant and a material has a density greater than that of the fuel 11. This containment vessel 14 must be able to withstand high impact without losing structural integrity. By this it is meant that, upon a high impact, the containment vessel 14 will deform, but it will not open any cracks to the exterior. These considerations suggest the use of a high strength, high melting point superalloy. An example of a material which may be utilized as the containment vessel 14 is tantalum or steel such as Haynes 188, although other materials may be utilized. The outer shield 18 in conjunction with the pellets 22 prevents the passage of radiation from the nuclear core 10 to the surface of the containment vessel 14 during normal operations.

In the event of a core 10 disruptive accident resulting in a nuclear fuel 11 meltdown, the molten fuel 11 from the core 10 will tend to flow in the direction of gravity. As heretofore mentioned, the orientation of this reactor after such accidents is not known: however, since the elements of this invention are all in a four Pi configuration, it will be assumed for descriptive purposes only that the molten fuel will flow towards the bottom of FIG. 1.

The molten fuel 11 from the core 10 will melt through the inner wall 16 and enter the inner space 20. There, the fuel 11 will be disbursed and diluted by the pellets 22 located in the inner space 20. In addition to the separation, the pellets 22 will absorb the neutrons being emitted by the molten fuel 11 (throughout this description, the terms "poisoning" and "capturing of neutrons" are used interchangeably). This dispersion and poisoning of the molten fuel 11 prevents a supercritical assemblage. If the molten fuel 11 continues flowing, it will melt through the pressure vessel 12, through the outer shield 18, and will collect adjacent to the containment vessel 14, since the containment vessel 14 has a high melting point. The pellets 22, being more dense than the molten fuel 11, will flow along with the fuel 11 through the pressure vessel 12 and the outer shield 18. The pellets 22 will also collect adjacent the containment vessel 14, and will continue their separation, dilution, and poisoning of the nuclear fuel 11. As can be seen, the pellets 22 thereby prevent the molten fuel 11 from recombining into a supercritical assembly. During this entire "penetration" process, the heat capacity of the different structural and shield materials acts to remove heat from the molten fuel. Further, the radioactive fusion products have been decaying, reducing the source of the heat in the subcritical assembly. Thus, by the time the fuel reaches the containment vessel, 14, it might well be in the form of a lower temperature "sludge," which is no longer molten. If the fuel were still molten, external cooling of the containment vessel 14 would be required to prevent eventual melt through.

However, the mixture of the pellets 22 and fuel 11 would still be in a subcritical array, alleviating this important safety consideration.

In addition to providing a poisoning and dilution function, the pellets 22 also act as a shock insulator. In the case of an impact accident, the forces on the containment vessel 14 may cause the deformation of the containment vessel 14, and will be transmitted to the outer shield 18 and the pressure vessel 12. The forces transmitted to the pressure vessel 12 will then be imparted to the pellets 22. Although these pellets 22 are closely packed, there will still remain some void spaces in the inner space 20. The impact forces will then cause the compression of the pellets 22 in the inner space 20, and this compression will expend most of the force before it can reach the nuclear core 10. In this manner, the pellets 22 reduce and may also eliminate the need for a separate impact shock isolation system, decrease the size of a radiation shielding required, and reducing total weight added to the nuclear reactor.

Figure 6:
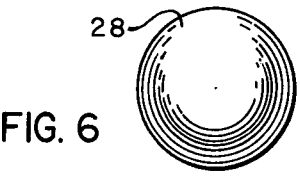
FIG. 6 is a cross-section view of a pellet utilized in FIG. 5.
Figure 5:
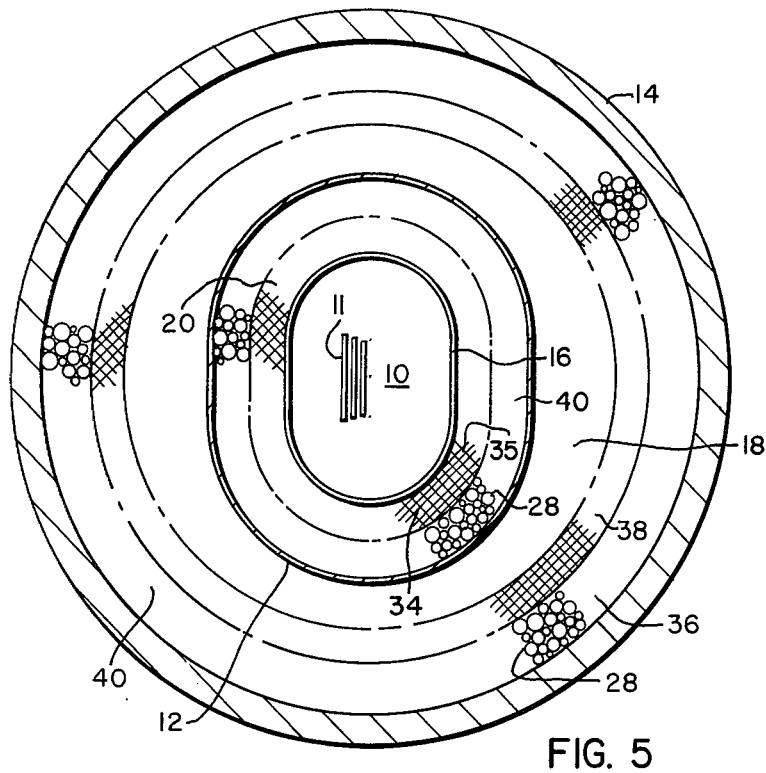
FIG. 5 is a modification of the system of FIG. 1.

FIG. 5 schematically illustrates a modification of the system shown in FIG. 1. The nuclear core 10 containing fuel elements 11, the inner wall 16, the inner space 20, the pressure vessel 12, the outer shield 18, and the containment vessel 14 are the same as previously described. In the inner space 20, adjacent the pressure vessel 12, is inserted an inner layer 40 of low density particles 28. These particles 28, which act as dilution and neutron-capturing means, have a density less than that of the fuel 11. These particles 28 would also serve as the primary neutron shield in a reactor having a heavy metal reflector. The particles 28 can be solid pellets, as shown in FIG. 6. These pellets 28 can be made of a material such as $TiB_2$.

Figure 7:
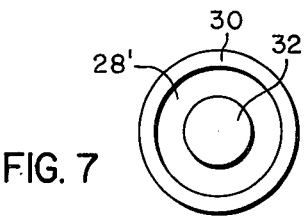
FIG. 7 is a cross-section view of a modification of the pellet of FIG. 6.
Figure 8:
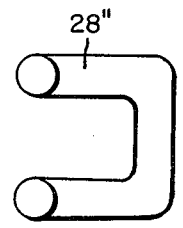
FIG. 8 is a modification of a pellet utilized in the reactor of FIG. 5.

Alternatively, as shown in FIG. 7, the pellets 28' can be double-tiered. These double-tiered pellets 28' have an outer shell 30 of a material less dense than that of the fuel 11 and with a melting point greater than the fuel 11. Inside the shell 30 is inserted a central portion 32. This central portion 32 is of a high neutron absorption cross-section material, and has a density less than that of the fuel 11 and may be exemplified by pyrographite coated $B_4C$. Alternatively, the particles 28 can be in the form of collars 28" as shown in FIG. 8.

Also placed in the inner space 20 is a mesh screen 34. This screen 34 is utilized to disperse and dilute the molten fuel 11, and to prevent the particles 28, which are less dense than the fuel 11, from flowing up through the molten fuel 11 to the core 10,, thereby not suppressing supercriticality. The screen 34 has openings 35 through which the molten fuel 11 can flow, but these openings 35 are smaller than the size of the particles 28, so that the particles 28 cannot flow through the screen 34.

As an example of the type of materials which can be used, the particles 28 shown as a solid pellet 28 in FIG. 6, may be $TiB_2$. If the particles 28 are the double pellets 28' as shown in FIG. 7, the outer shell 30 can be made of pyrographite, and the central portion 32 can be boron-carbide. If the particles 28" are the collars 28" as shown in FIG. 8, which fit over the screen 34, these collars 28" can also be made of $TiB_2$. The screen 34, for example, can be made of tungsten. The low density particles 28 act as thermal insulation, and may serve as the primary neutron shield in a heavy metal reflector reactor.

An outer layer 36 of the same particles 28 as the inner layer 40 is inserted into the outer shield 18 adjacent the containment vessel 14. This outer layer 36 is held in its position by a second screen 38 located adjacent to it. This screen 38 is held in its place by securing means 40. Although only one particle layer 36 and one screen 38 is shown as being in the outer shield 18, it is to be understood that a plurality of these layers 36 and 38 may be inserted into the outer shield 18. These intermediate layers are positioned radially inward of the outer screen 38 in alternating layers of particles and screens. The number of these intermediate layers is dependent upon the desires of designers, and possible size weight restrictions.

In the event of a core meltdown, the molten fuel 11 melts through the inner wall 16 and passes through the inner screen 34. The inner screen 34 separates, spreads, and dilutes the molten fuel 11 flowing through it. The molten fuel 11 then enters the inner layer 40 of particles 28. These particles 28 further dilute the molten fuel 11, and additionally poison the fuel 11 by capturing the neutrons emitted by the fuel 11. The particles 28 cannot flow through the molten fuel 11 into the core 10 because the openings 35 in the screen 34 are smaller than the size of a particle 28. If the molten fuel continues flowing it flows through the pressure vessel 12 and into the outer shield 18. It then is additionally separated by the screen 38 and by the outer layer 36 of particles 28. The outer screen 38 and the outer layer 36 prevents the assemblage of a supercritical mass by diluting and separating the molten fuel 11. As before, the particles 28 in the outer layer 36 also capture the neutrons emitted by the molten fuel 11 and serve as a thermal insulation.

As with the pellets of the system as shown in FIG. 1, the layers 40 and 36 of particles 28 provide a shock insulation of the nuclear core 10 from impact imparted to the containment vessel 14.

Figure 9:
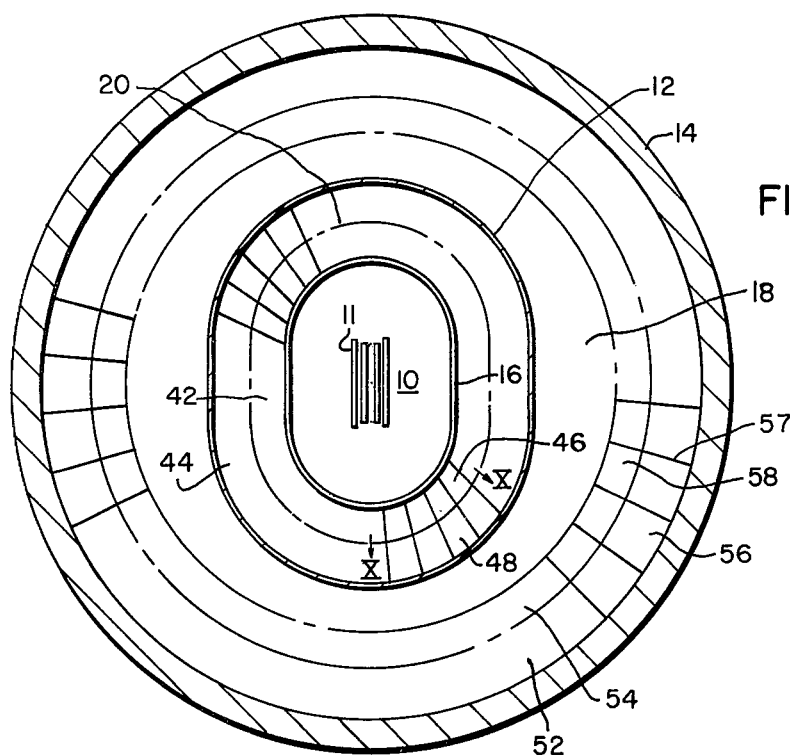
FIG. 9 is a modification of the system illustrated in FIG. 1.

FIG. 9 schematically illustrates a further modification of the system shown in FIG. 1. The nuclear core 10, containing nuclear fuel 11, the inner wall 16, and pressure vessel 12, the outer shield 18, and the containment vessel 14 are similar to those in FIG. 1. In this modification, separation and dilution means in the form of cellular structures 42 and 44 are inserted into the inner space 20. An inner cellular structure 42 is positioned adjacent the inner wall 16, and an outer cellular structure 44 is positioned adjacent the pressure vessel 12. The inner cellular structure 42 and the outer cellular structure 44 are both made of a material with a melting point greater than that of the fuel 11 in the core 10. The individual cells 46 of the inner cellular structure 42, and the individual cells 48 of the outer cellular structure 44 are generally aligned radially outward from the core 10, and the inner cells 46 are aligned opposite the outer cells 48. In this manner, any molten fuel 11 which enters the cells 46 of the inner cellular structure 42 passes through the inner cellular structure 42 and enters the cells 48 of the outer cellular structure 44. The mass of material in the coils 46, 48 also acts as the initial radiation shield.

Figure 10:
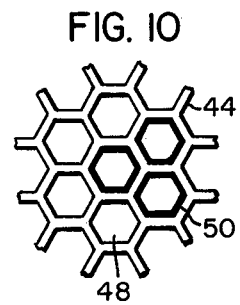
FIG. 10 is a cross-section view taken along lines X—X of FIG. 9.
Figure 11:
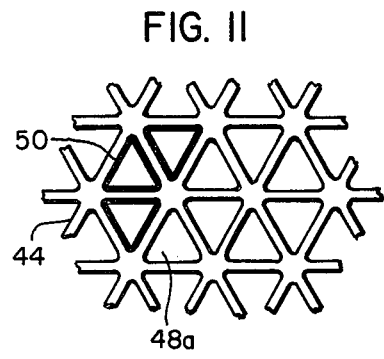
FIG. 11 is a modification of the structure of FIG. 10.
Figure 12:
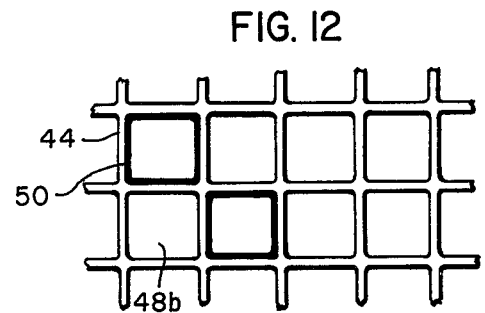
FIG. 12 is a modification of the structure shown in FIG. 10.
Figure 13:
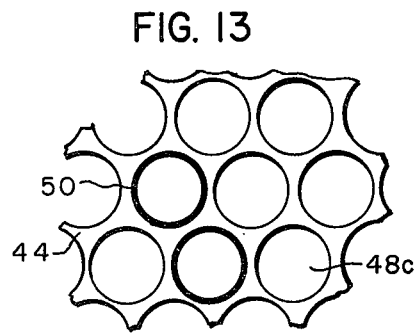
FIG. 13 is a modification of the structure shown in FIG. 10.
Figure 14:
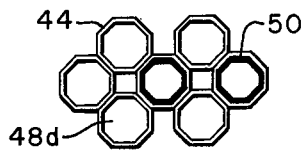
FIG. 14 is a modification of the structure shown in FIG. 10.

FIG. 10 illustrates a possible configuration of the outer cellular structure 44, and this configuration would be similar to that of the inner cellular structure 42. In this configuration, the individual cells 48 of the outer cellular structure 44 are hexagonal. Other possible configurations for the individual cells 48 are: triangular cells 48a, FIG. 11; rectangular cells 48b, FIG. 12; circular cells 48c, FIG. 13; or octagonal cells 48d, FIG. 14.

The outer cellular structure 44 differs from the inner cellular structure 42 in that the outer cellular structure 44 includes means for capturing neutrons emitted by the fuel 11. These neutron capturing means are liners 50

(FIG. 10) which are inserted into the individual cells 48 of the outer cellular structure 44. These liners 50 are made of a material with a high neutron absorption crosssection. The liners 50 should have a melting point greater than the fuel 11 melting point. The liners 50, for example, can be made of alloys of boron such as TiB$_2$.

In addition to the cellular structures 44 and 42 positioned in the inner space 20, a general spherical cellular outer collector 52 is positioned adjacent to the containment vessel 14. Radially inward of the outer collector 52 is a generally spherical cellular inner collector 54. The outer collector 52 and the inner collector 54 can take any of the configurations of the inner cellular structure 42 and the outer cellular structure 44. The individual cells 56 of the outer collector 52, and the individual cells 58 of the inner collector 54, are generally aligned radially outward from the core 10, and the cells 56 and 58 are generally aligned opposite each other. The individual cells 56 in the outer collector 52 have linings 57 similar to that in the outer cellular structure 44. Both the outer collector 52 and the inner collector 54 are made of a material with a melting point greater than the fuel 11 melting point, and the linings 57 in the individual cells 56 have a melting point greater than the fuel 11 melting point. An example of the type of material which may be utilized to make the cullular structures 42 and 44, and the collectors 52 and 54, is tungsten.

In the event of a core 10 meltdown, the molten fuel 11 melts through the inner wall 16, and enters the inner cellular structure 42. Here is is diluted and disbursed among the various cells 46, and then passes through to the individual cells 48 of the outer cellular structure 44. Besides being additionally diluted, the molten fuel 11 is poisoned in the outer cellular structure 44 by the neutron capturing linings 50 of the individual cells 48 of the outer cellular structure 44. If the molten fuel 11 continues flowing, it will melt through the pressure vessel 12 and through the outer shield 18 and be separated and diluted by the inner collector 54. As the molten fuel 11 flows through the individual cells 48 of the inner collector 54 and to the individual cells 56 of the outer collector 52, it is further diluted, and is poisoned by the linings 57 of the cells 56 in the outer collector 52.

In addition to diluting and poisoning molten fuel 11, the cellular structures 42, 44, 52, and 54 function to absorb shock forces. If an impact accident deforms the containment vessel 14, the outer collector 52 and the inner collector 54 will absorb these forces by being compressed; "crunched." Any remaining forces which are transmitted through the outer shield 18 and the pressure vessel 12 are further mitigated by the "crunching" of the outer cellular structure 44 and the inner cellular structure 42. In this manner, the core 10 is protected from impact forces, and a separate isolation system may not be needed.

Thus, it can be seen that this invention provides a means for diluting and poisoning of molten fuel to prevent the assemblage of a supercritical mass irrespective of the orientation of the nuclear reactor after an accident, and eliminates a substantial obstacle to the utilization of mobile nuclear power plants.

What is claimed is:

1. A dilution system for nuclear power plants comprising:
    a nuclear core containing nuclear fuel, said fuel having a density and a melting point, said fuel emitting neutrons;
    an inner wall encapsulating said nuclear core, said inner wall being of a material with a melting point less than said fuel melting point;
    a pressure vessel encapsulating said inner wall, said pressure vessel being of a material with a melting point less than said fuel melting point, said pressure vessel and said inner wall forming an inner space therebetween;
    an inner screen disposed within said inner space located adjacent said inner wall, said inner screen being of a material having a melting point greater than said fuel melting point, said inner screen having openings therein;
    an inner layer of low-density particles disposed within said inner space, said inner layer being positioned adjacent said pressure vessel, said low-density particles being of a material with a melting point greater than said fuel melting point, said particles having a density less than said fuel density;
    a generally spherical outer shield encapsulating said pressure vessel, said outer shield comprising a generally spherical outer layer of low-density pellets adjacent said containment vessel and a generally spherical outer screen coupled to said containment vessel, said outer screen being positioned radially inward of said outer layer of low-density pellets, said outer screen having openings of a size smaller than said low-density pellet size, said outer screen being of a material having a melting point greater than said fuel melting point; and
    a generally spherical containment vessel encapsulating said outer shield.

2. the system according to claim 1 wherein said inner screen comprises tungsten.

3. The system according to claim 1 wherein said low-density particles are pellets.

4. The system according to claim 3 wherein said low-density pellets comprise:
    a shell of material with a melting point greater than said fuel melting point, said shell having a density less than said fuel density; and
    a central portion positioned in said shell, said central portion being of a high neutron absorption crosssection material, said central portion having a density less than said fuel density, said low-density pellets having a size, said openings in said inner screen being of a size smaller than said low-density pellet size, whereby said low-density pellets in said inner layer are prevented from moving through said inner screen.

5. The system according to claim 4 sherein said central portion of said low-density pellet comprises boron carbide.

6. The system according to claim 4 wherein said shell comprises pyrographite.

7. The system according to claim 4 wherein said low-density pellets substantially fill said inner space.

8. A dilution system for nuclear power plants comprising:
    a nuclear core containing nuclear fuel, said fuel having a density and a melting point, said fuel emitting neutrons;
    an inner wall encapsulating said nuclear core, said inner wall being of a material with a melting point less than said fuel melting point;
    a pressure vessel encapsulating said inner wall, said pressure vessel being of a material with a melting point less than said fuel melting point, said pressure vessel and said inner wall forming an inner space therebetween;

a generally spherical outer shield encapsulating said pressure vessel, said outer shield comprising means for preventing the passage of radiation through said outer shield;

a generally spherical containment vessel encapsulating said outer shield, means for dilution of molten fuel positioned in said inner space comprising an inner cellular structure positioned adjacent said inner wall, said inner cellular structure being of a material having a melting point greater than said fuel melting point and an outer cellular structure positioned adjacent said pressure vessel, said outer cellular structure being of a material having a melting point greater than said fuel melting point, said inner and outer cellular structures being aligned such that a cell of one structure is generally opposite a cell of the other structure, said inner and outer cellular structures being aligned in a generally radial direction from said core; and means for capturing neutrons emitted by said fuel positioned in said inner space.

9. The system according to claim 8 wherein said means for capturing neutrons emitted by said fuel comprises said cells of said outer cellular structure having linings positioned therein, said linings being of a high neutron absorption cross-section material, said linings having a melting point greater than said fuel melting point.

10. The system according to claim 9 wherein said linings of said cells of said outer cellular structure comprises a tungsten-boron alloy.

11. The system according to claim 9 wherein said outer shield comprises:

a generally spherical cellular outer collector positioned adjacent said containment vessel, said outer collector having cells, said cells having linings positioned therein, said outer collector cell linings being of a high neutron absorption cross-section material, said linings being of a material having a melting point greater than said fuel melting point, said outer collector being of a material having a melting point greater than said fuel melting point; and a generally spherical cellular inner collector positioned radially inwardly of and adjacent said outer collector, said inner collector being of a material having a melting point greater than said fuel melting point, said cells in said inner collector and said cells in said outer collector being aligned such that a cell of one collector is generally opposite a cell of the other collector, said inner and outer collectors being aligned in a generally radial direction from said core.

* * * * *